United States Patent
Labarre et al.

(10) Patent No.: US 9,638,274 B2
(45) Date of Patent: May 2, 2017

(54) DISK-BRAKE PAD

(71) Applicant: Robert Bosch GmbH, Stuttgart (DE)

(72) Inventors: Xavier Labarre, Saint Georges du Bois (FR); Jean-Louis Bonnec, Les Ponts de Ce (FR); Xavier Prades, Tierce (FR); Fred Tempereau, Saint Jean des Mauvrets (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/744,625

(22) Filed: Jun. 19, 2015

(65) Prior Publication Data

US 2015/0369308 A1    Dec. 24, 2015

(30) Foreign Application Priority Data

Jun. 19, 2014   (FR) ..................... 14 55646

(51) Int. Cl.
*F16D 65/097*    (2006.01)
*F16D 65/00*     (2006.01)
*F16D 65/092*    (2006.01)

(52) U.S. Cl.
CPC ....... *F16D 65/0006* (2013.01); *F16D 65/092* (2013.01); *F16D 65/0971* (2013.01)

(58) Field of Classification Search
CPC .. F16D 65/092; F16D 65/095; F16D 65/0971; F16D 65/0977; F16D 65/0006
USPC ......... 188/73.1, 73.21, 250 B, 250 E, 250 G, 188/258
See application file for complete search history.

(56) References Cited

U.S. PATENT DOCUMENTS

| | | | | |
|---|---|---|---|---|
| 3,625,316 | A * | 12/1971 | Mori | F16D 55/226 188/73.35 |
| 4,995,482 | A * | 2/1991 | Kobayashi | F16D 55/227 188/264 G |
| 5,320,200 | A * | 6/1994 | Hashimoto | F16D 65/0006 188/250 B |
| 5,975,252 | A * | 11/1999 | Suzuki | F16D 55/227 188/1.11 W |
| 9,279,465 | B2 * | 3/2016 | Kobayashi | F16D 65/092 |
| 2003/0213658 | A1 | 11/2003 | Baba | |
| 2006/0027427 | A1 * | 2/2006 | Anda | F16D 65/0006 188/73.1 |
| 2006/0157307 | A1 * | 7/2006 | Tsurumi | F16D 65/0971 188/250 G |

FOREIGN PATENT DOCUMENTS

| | | | |
|---|---|---|---|
| DE | 10 2005 036 972 A1 | 3/2006 | |
| FR | 2 925 635 A1 | 6/2009 | |
| WO | WO2013039175 * | 3/2013 | ......... F16D 65/0971 |

* cited by examiner

*Primary Examiner* — Christopher Schwartz
(74) *Attorney, Agent, or Firm* — Maginot, Moore & Beck LLP

(57) ABSTRACT

A disk-brake pad includes a backing plate that has a lower edge which defines two locations configured to accommodate lower clips of an antirattle device. The antirattle device includes a fastener positioned at the top thereof that is configured to irreversibly clip via a tongue defined by a cut in the fastener so as to clip irreversibly into a notch defined by an upper edge of the backing plate.

3 Claims, 2 Drawing Sheets

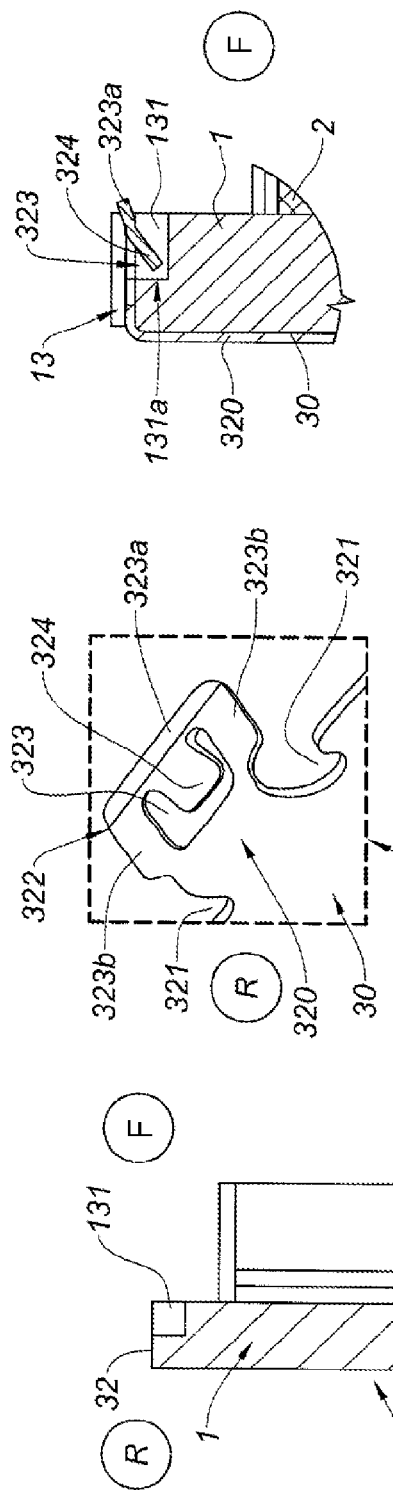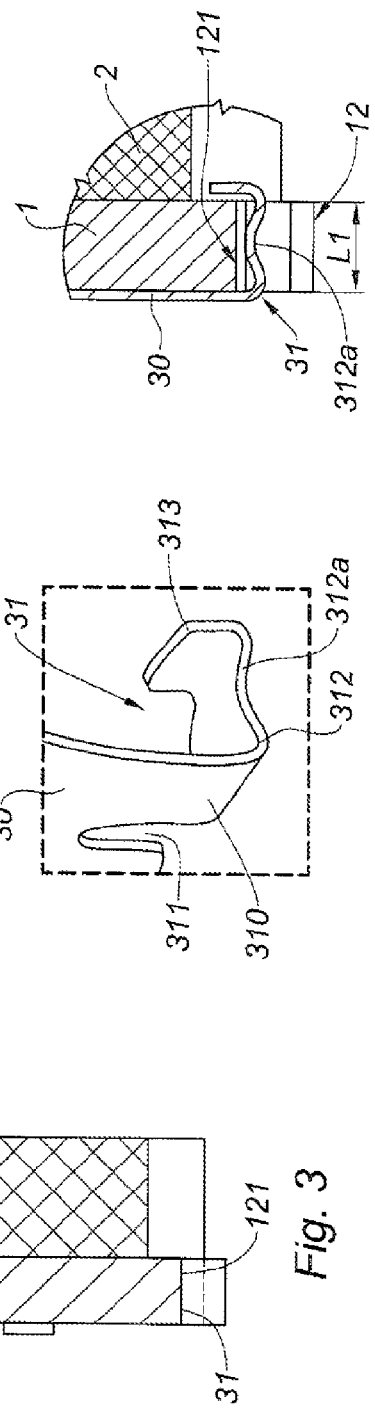

DISK-BRAKE PAD

This application claims priority under 35 U.S.C. §119 to patent application no. FR 1 655 646, filed on Jun. 19, 2014 in France, the disclosure of which is incorporated herein by reference in its entirety.

The subject of the present disclosure is a disk-brake pad comprising a backing plate provided with lateral lugs for mounting it in the housings of the arms of the brake caliper, the backing plate on its front face bearing the brake lining and on its rear face bearing an antirattle device in the form of a plate connected to the backing plate by tabs.

BACKGROUND

An antirattle device that clips onto a brake pad is already known. This antirattle device 200 is depicted in perspective in FIG. 6. It is made up of a thin sheet metal plate 201 which may or may not be covered and which is provided with two tabs 202 at the bottom and with one tab 203 at the top defining three points of a convex triangle. This antirattle device 200 is intended to be fixed in place by engaging on the backing plate of a brake pad.

Attachment is achieved simply by deforming the tabs 202, 203 so as to clamp the backing plate. However, this known solution has a number of disadvantages, particularly the fact that the antirattle device is deformed in the region of the interface with the caliper; the fingers or piston of the actuator reduce the functional clearance such that the residual torque and pedal travel are increased.

Furthermore, the firmness with which the antirattle device is held on the pad varies according to the relative dimensions of the pad and of the antirattle device.

SUMMARY

It is an object of the present disclosure to develop a disk-brake pad that makes it possible to dissociate the pressure between the caliper and the pad, minimize the interference with the caliper which are associated with deformation or lack of flatness, and remain secured to the pad.

To this end, one subject of the present disclosure is a brake pad of the type defined hereinabove characterized in that
  the backing plate comprises, at the lower edge, two fixing locations one on either side of the median axis, these locations being delimited by an interior shoulder,
  the antirattle device comprises two lower clips which are bent over and end in a return to straddle the lower edge of the backing plate at the fixing locations, and
  a fastener at the top, that can be clipped irreversibly and catches in a notch on the upper edge of the backing plate, this notch opening onto the top and the side of the backing plate opposite the one against which the antirattle device is pressed.

This brake pad has the advantage of being provided with an antirattle device which dissociates the pressure between the caliper and the brake pad and minimizes the interference with the caliper caused by deformations or lack of flatness.

The antirattle device is firmly secured to the back plate and, once assembled, the antirattle device is free of any stress that could cause it to deform. Thus, overall, the pad is non-deformable.

According to another advantageous feature, the clip comprises a pressing wave for pressing against the lower edge of the backing plate, which stabilizes the antirattle device still further with respect to the backing plate while at the same time achieving contact that offers a certain degree of elasticity to absorb dimensional spread.

According to another feature, the fastener is substantially along the axis of the body of the antirattle device between the two lower clips and the notch of the backing plate is thus in a position homologous with that of the fastener.

According to another advantageous feature, the fastener consists of a bent-over tab provided with a tongue cut into an opening from the front of the opening and projecting from this opening, the free end of the elastic tongue facing toward the body of the antirattle device so as to retract elastically as the back of the notch passes and revert elastically to its shape in the notch so as to brace against the back of the notch of the backing plate.

According to another advantageous feature, the notch of the upper edge of the backing plate is wider than the locking tongue of the fastener so that the edges of the fastener on either side of the opening press against the top of the backing plate of the notch.

Thus, overall, the disk-brake pad according to the disclosure has the advantage of being particularly simple to embody and effective in the combination of the backing plate, the lining and the antirattle device.

BRIEF DESCRIPTION OF THE DRAWINGS

The present disclosure will be described hereinafter in greater detail with the aid of one example of a disk-brake pad according to the disclosure which is depicted in the attached drawings in which:

FIG. 3 is a view in section on III-III of FIG. 1 of the brake pad with its antirattle device, FIG. 4A is a perspective view of a clip of the antirattle device according to FIG. 2, FIG. 4B is a partial view in section on III-III of FIG. 1, of the backing plate and of the antirattle device in the region of the clip, FIG. 5A is a perspective view of the fastener of the antirattle device of FIG. 1, FIG. 5B is a view in section on III-III of FIG. 1 of the fastener.

DETAILED DESCRIPTION

Figure 1:
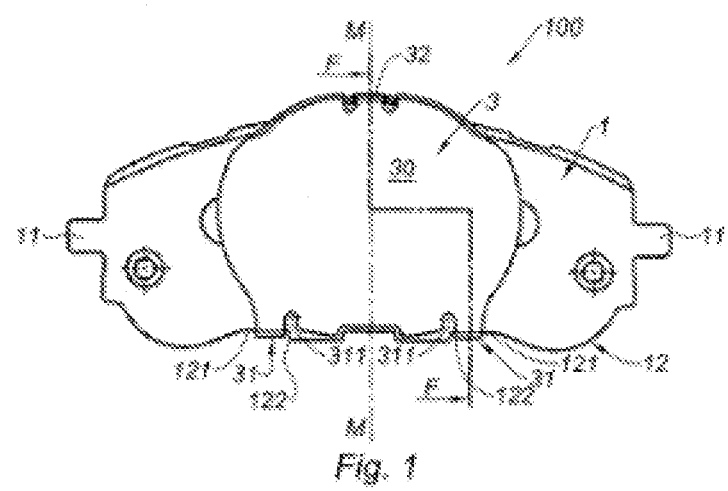
FIG. 1 is a rear view of the brake pad provided with an antirattle device.
Figure 2:
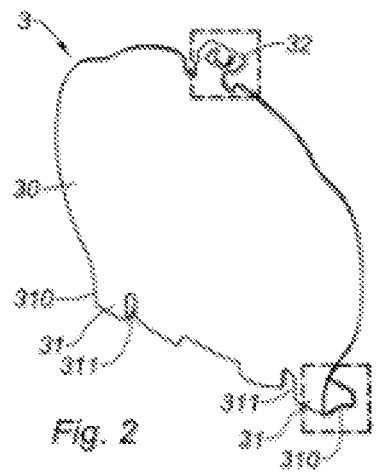
FIG. 2 is a perspective view of the antirattle device on its own.
Figure 6:
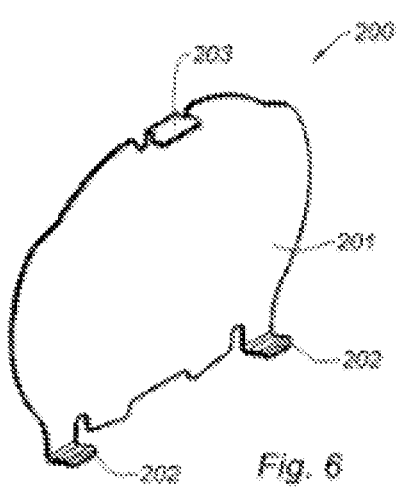
FIG. 6 is a perspective view of an antirattle device of a brake pad according to the prior art.

According to FIG. 1, a subject of the disclosure is a brake pad 100 made up of a backing plate 1 made of thick sheet metal provided, on its front face, with the brake lining 2. The backing plate 1, of kidney bean elongate overall shape, ends on each side in a lug 11 for installing it in the body of the brake, namely in the housings of the disk-brake caliper or carrier, these elements not having been depicted.

The back of the backing plate 1, on the opposite side to the side of the lining 2, is provided with an antirattle device 3 to press against the disk-brake caliper or piston. The pressure for applying the brake is transmitted to the backing plate 2 via the antirattle device 3. The same is true of the pressing of the pad against the caliper.

The antirattle device 3 is a flattened or even flat component made of thin sheet metal covered if appropriate with an insulating rubber or paint. Via its body 30, the device 3 covers the median part of the overall elongate curved shape of the backing plate 2 to occupy the surface against which the piston or the corresponding surface against which the caliper presses against the backing plate 1. These surfaces have not been specifically depicted in the figures.

The antirattle device 3 is provided at the bottom with two clip-shaped tabs 31 which catch on the lower edge 12 of the backing plate 1 at two predefined locations 121 bounded on the inside, which means to say on the side closest to the median axis MM or, more generally, the median line MM of the pad, by a shoulder 122 that forms an end stop while at the same time leaving a certain clearance to allow a small amount of transverse slippage between the antirattle device 3 and the backing plate 2.

The median line MM of the brake pad 100 is the line corresponding more or less to the axis of symmetry thereof, passing through the middle of the bearing surface for the piston of the brake.

At the top, substantially in the middle of the pad 100, the antirattle device 3 comprises a fastener 32 for attaching the device to the backing plate 1 so that the two clips 31 and the fastener 32 occupy the vertices of a convex, notably isosceles, triangle.

According to FIGS. 2, 3, 4A, 4B, the clips 31 of the lower part of the antirattle device 3 are symmetric about the median axis MM which means that the description can be confined to just one of the clips 31.

The clip 31 is made up of a branch 310 cut from the body 30 of the antirattle device 3 leaving a cutout 311 with a rounded bottom. The branch 310 is extended by a bent-over tab 312, bent over substantially at right angles with respect to the surface of the body 32 of the backing plate 1; its width L1 (FIG. 4B) is substantially equal to the thickness of the backing plate 1 and the tab 312 ends in a return 313. The tab 312 comprises a wave 312a to press against the lower edge 12 in the thickness 121 of the backing plate.

At the top, the third point of connection of the antirattle device 3 to the backing plate 1 consists of a fastener 32 according to FIGS. 2, 3, 5A, 5B.

The fastener 32 is composed of a branch 320 cut from the body 30 of the antirattle device 3. This branch 320 is perforated by two lateral cutouts 321 so as to have a certain elasticity.

The branch 320 in the plane of the body 30 of the antirattle device continues in the form of a tab 322 bent over at right angles. This tab 322 has a cutout in the form of an opening 323 bearing an elastic tongue 324 originating from the front edge 323a of this opening and projecting under the opening. The tongue 324 faces downward and toward the rear (R) to allow assembly by irreversible clipping.

The upper edge 13 of the backing plate 1 is provided with a notch 131 open to the top and to the front (F), leaving at the rear a thin web that forms an end stop 131a for the tongue 324.

The width of the notch 131 is greater than that of the tongue 324 so as to have clearance for transverse slippage, moreover defined by the locations 121 accommodating the clips 31 at the bottom of the backing plate 1. The tab 322 has a width markedly greater than that of the notch 131 even in the face of possible slippages so that the sides 323b of the tab 322 bordering the opening 323 always press against the edge of the backing plate on either side of the notch 131 into which the tongue 324 fits and catches.

What is claimed is:

1. A disk-brake pad, comprising:
   a backing plate that includes:
      a front face that supports a brake lining;
      a rear face;
      a lower edge that defines two fixing locations on opposite sides of a median axis of the backing plate, each fixing location being delimited by a respective interior shoulder of the backing plate; and
      an upper edge that defines a notch opening onto a top and a side of the backing plate;
   an antirattle device that includes a plate which defines:
      two lower clips that that connect the antirattle device to the backing plate, the two clips being in a bent over configuration so as to end in a return that straddles the lower edge of the backing plate at the fixing locations; and
      a fastener at a top region of the plate that is configured to irreversibly clip the antirattle device to the backing plate by catching in the notch in the upper edge of the backing plate when the antirattle device is pressed against the rear face of the backing plate; and
      lateral lugs configured to mount the backing plate in housing of arms of a brake caliper,
   wherein the fastener is configured to irreversibly clip the antirattle device to the backing plate such that the antirattle device cannot be removed without damaging the fastener,
   wherein the fastener includes a bent-over tab that defines:
      an opening; and
      an elastic tongue formed by a cut into the opening, the tongue having a free end projecting from the opening and facing toward the plate of the antirattle device, and being configured to retract elastically as a back of the notch passes by and revert elastically to a resting shape in the notch so as to brace against the back of the notch, and
   wherein the notch in the backing plate is wider than the tongue of the fastener, so that edges of the fastener on either side of the opening press against a top of the backing plate.

2. The disk-brake pad according to claim 1, wherein each of the two lower clips includes a pressing wave that is configured to press against the lower edge of the backing plate.

3. The disk-brake pad according to claim 1, wherein:
   the fastener is located substantially along an axis of the antirattle device between the two lower clips; and
   the notch of the backing plate is located so as to be homologous with the location of the fastener.

* * * * *